United States Patent
Agan et al.

(10) Patent No.: US 12,130,206 B2
(45) Date of Patent: Oct. 29, 2024

(54) CONTAINER MONITORING DEVICE

(71) Applicant: Tyco Fire Products LP, Lansdale, PA (US)

(72) Inventors: Arash Agan, Pawtucket, RI (US); Nicholas DiFilippo, Narragansett, RI (US); Steven Inabinet, Appleton, WI (US); Zachary L. Magnone, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 112 days.

(21) Appl. No.: 17/616,057

(22) PCT Filed: Jun. 3, 2020

(86) PCT No.: PCT/IB2020/055254
§ 371 (c)(1),
(2) Date: Dec. 2, 2021

(87) PCT Pub. No.: WO2020/245750
PCT Pub. Date: Dec. 10, 2020

(65) Prior Publication Data
US 2022/0299397 A1    Sep. 22, 2022

Related U.S. Application Data

(60) Provisional application No. 62/856,991, filed on Jun. 4, 2019.

(51) Int. Cl.
*G01M 3/24* (2006.01)
*G01F 22/00* (2006.01)
*G01F 23/296* (2022.01)

(52) U.S. Cl.
CPC ............ *G01M 3/24* (2013.01); *G01F 22/00* (2013.01); *G01F 23/2966* (2013.01)

(58) Field of Classification Search
CPC ....... G01F 23/2966; G01F 22/00; G01M 3/24
(Continued)

(56) References Cited

U.S. PATENT DOCUMENTS

| | | |
|---|---|---|
| 4,729,245 A | 3/1988 | Hansman, Jr. |
| 5,931,233 A | 8/1999 | La Bonte et al. |

(Continued)

FOREIGN PATENT DOCUMENTS

| | | | | |
|---|---|---|---|---|
| GB | 2325159 A | * | 11/1998 | ............. A62C 35/02 |
| GB | 2 498 952 A | | 8/2013 | |
| WO | WO-2018/112385 A2 | | 6/2018 | |

OTHER PUBLICATIONS

International Search Report and Written Opinion on International Application No. PCT/IB2020/055254, mail date Sep. 4, 2020, 13 pages.

(Continued)

*Primary Examiner* — Nathaniel J Kolb
(74) *Attorney, Agent, or Firm* — Foley & Lardner LLP

(57) ABSTRACT

A system includes a controller for monitoring a fill level of a container. The controller is configured to receive first vibrational response data relating to a vibrational response of the container in a first state, receive second vibrational response data relating to a vibrational response of the container in a second state, and use the first vibrational response data and the second vibrational response data to identify a change in fill level of the container between the first state and the second state.

16 Claims, 11 Drawing Sheets

(58) Field of Classification Search
USPC .................................................. 73/290 V
See application file for complete search history.

(56) References Cited

U.S. PATENT DOCUMENTS

| | | | |
|---|---|---|---|
| 6,029,751 A | 2/2000 | Ford et al. | |
| 6,338,272 B1* | 1/2002 | Heuft | G01L 9/0008 |
| | | | 73/579 |
| 6,443,004 B1 | 9/2002 | Heuft et al. | |
| 6,631,639 B1 | 10/2003 | Dam et al. | |
| 7,424,824 B2 | 9/2008 | Usui et al. | |
| 7,775,292 B1 | 8/2010 | Romanco | |
| 7,934,564 B1 | 5/2011 | Stell et al. | |
| 8,353,209 B1 | 1/2013 | Zimmerli | |
| 8,378,834 B1 | 2/2013 | Glaub et al. | |
| 8,448,509 B2 | 5/2013 | Elofsson et al. | |
| 8,622,147 B1 | 1/2014 | Williams et al. | |
| 8,752,640 B1 | 6/2014 | Pottlitzer et al. | |
| 8,850,881 B2 | 10/2014 | Song et al. | |
| 8,875,569 B2 | 11/2014 | Mokander | |
| 9,194,944 B2 | 11/2015 | Nakagawa et al. | |
| 9,399,150 B1 | 7/2016 | Almutairi | |
| 9,539,450 B2 | 1/2017 | Rouse et al. | |
| 10,161,782 B2 | 12/2018 | Saltzgiver et al. | |
| 10,478,651 B2 | 11/2019 | Moffa | |
| 10,695,600 B2 | 6/2020 | Moffa | |
| 10,898,747 B2 | 1/2021 | Moffa | |
| 11,819,721 B2 | 11/2023 | Moffa | |
| 2002/0088625 A1 | 7/2002 | Brennan | |
| 2002/0116157 A1 | 8/2002 | Markle et al. | |
| 2002/0116999 A1 | 8/2002 | Heger | |
| 2004/0065451 A1 | 4/2004 | McSheffrey et al. | |
| 2004/0226726 A1 | 11/2004 | Holland et al. | |
| 2005/0110632 A1 | 5/2005 | Berezowski et al. | |
| 2005/0111995 A1 | 5/2005 | Everson | |
| 2005/0183868 A1 | 8/2005 | Taylor et al. | |
| 2005/0273279 A1 | 12/2005 | Faltesek | |
| 2005/0285730 A1 | 12/2005 | Turner | |
| 2006/0021448 A1* | 2/2006 | Young | G01F 22/02 |
| | | | 73/861.26 |
| 2007/0044979 A1 | 3/2007 | Popp et al. | |
| 2007/0074877 A1 | 4/2007 | Thompson | |
| 2007/0241866 A1 | 10/2007 | Cool et al. | |
| 2007/0241879 A1 | 10/2007 | Jobe et al. | |
| 2008/0103768 A1 | 5/2008 | Berezowski et al. | |
| 2008/0106437 A1 | 5/2008 | Zhang et al. | |
| 2009/0321093 A1 | 12/2009 | Lalouz | |
| 2010/0236796 A1 | 9/2010 | Chattaway et al. | |
| 2012/0018177 A1 | 1/2012 | Eckholm et al. | |
| 2012/0168184 A1 | 7/2012 | Enk, Sr. | |
| 2013/0046884 A1 | 2/2013 | Frost et al. | |
| 2013/0106600 A1 | 5/2013 | Hall et al. | |
| 2013/0240222 A1 | 9/2013 | Krueger | |
| 2013/0262170 A1 | 10/2013 | Cordio et al. | |
| 2013/0263657 A1 | 10/2013 | Sides | |
| 2013/0341053 A1 | 12/2013 | Rouse et al. | |
| 2014/0064426 A1 | 3/2014 | Hess et al. | |
| 2014/0331977 A1 | 11/2014 | Smiddy et al. | |
| 2014/0352407 A1 | 12/2014 | Vernon-Harcourt et al. | |
| 2015/0053431 A1 | 2/2015 | Graham et al. | |
| 2015/0136430 A1 | 5/2015 | Livchak et al. | |
| 2015/0231431 A1 | 8/2015 | Sandahl et al. | |
| 2015/0345907 A1 | 12/2015 | Varga et al. | |
| 2015/0346163 A1* | 12/2015 | Garrett | G01N 29/4454 |
| | | | 73/579 |
| 2015/0367157 A1 | 12/2015 | Rohlik et al. | |
| 2016/0096053 A1 | 4/2016 | Beechy et al. | |
| 2016/0101304 A1 | 4/2016 | Langenbeck et al. | |
| 2016/0117646 A1 | 4/2016 | Lerick et al. | |
| 2016/0121151 A1 | 5/2016 | Schmitt et al. | |
| 2016/0263410 A1 | 9/2016 | Enk, Sr. | |
| 2016/0313170 A1 | 10/2016 | Cameron | |
| 2016/0349097 A1 | 12/2016 | Crouse | |
| 2016/0381440 A1 | 12/2016 | Davis | |
| 2017/0030528 A1 | 2/2017 | Dietzen et al. | |
| 2017/0206776 A1 | 7/2017 | Linder et al. | |
| 2017/0216646 A1 | 8/2017 | Casamento | |
| 2017/0233243 A1 | 8/2017 | McNicholas | |
| 2017/0251021 A1 | 8/2017 | Trani | |
| 2018/0114430 A1 | 4/2018 | Westmacott et al. | |
| 2018/0161610 A1 | 6/2018 | Kjellman | |
| 2018/0204441 A1 | 7/2018 | Zribi et al. | |
| 2024/0082616 A1 | 3/2024 | Moffa | |

OTHER PUBLICATIONS

Warren, Carl H., "Technical Report RD-GC-86-16 Vibration of Pressurized Cylinders", Jan. 1988, 11 pages.

Ventyx, Abb, "Service Suite Mobile", 2010 (5 pages).

Warren et al., Technical Report RD-GC-86-16: Vibration of Pressurized Cylinders, U.S. Army Missile Command, Jan. 1988, 11 pages.

* cited by examiner

CONTAINER MONITORING DEVICE

CROSS-REFERENCE TO RELATED PATENT APPLICATIONS

This application claims priority to and the benefit of U.S. Provisional Patent Application No. 62/856,991, filed Jun. 4, 2019, which is incorporated herein by reference in its entirety.

BACKGROUND

The present disclosure relates generally to systems for determining the fill level of a container. More specifically, the present disclosure relates to systems for determining the fill level of a container indirectly.

Containers, such as tanks, are commonly used to store fluids, such as liquids and gasses, for extended periods of time. One such example of this is an expellant gas cartridge of a fire suppression system. Fire suppression systems utilize expellant gas to force a fire suppressant agent (e.g., foam, powder, etc.) out of a storage tank and through a pipe to a nozzle. When the fire suppression system is not in use, the expellant gas cartridge remains pressurized with expellant gas for extended periods of time. If the cartridge has even a small leak, a large portion of the expellant gas can leak out over time, potentially preventing the fire suppression system from functioning properly in the event of a fire.

SUMMARY

One embodiment relates to a system including a controller for monitoring a fill level of a container. The controller is configured to: receive first vibrational response data relating to a vibrational response of the container in a first state; receive second vibrational response data relating to a vibrational response of the container in a second state; and use the first vibrational response data and the second vibrational response data to identify a change in fill level of the container between the first state and the second state.

Another embodiment relates to a method of monitoring a fill level of a container. The method includes: exciting, by an actuator, the container when the container has a known fill level such that the container experiences a first vibrational response; sensing, by a receiver, the first vibrational response of the container; exciting, by the actuator, the container when the container has an unknown fill level such that the container experiences a second vibrational response; sensing, by the receiver, the second vibrational response of the container; and determining a change in fill level between the known fill level and the unknown fill level based on the first vibrational response and the second vibrational response.

Another embodiment relates to a fire suppression system including: a canister containing an expellant gas; a nozzle; a system actuator configured to selectively fluidly couple the canister to the nozzle such that the expellant gas is released from the canister to force a fire suppressant agent through the nozzle; a driver configured to excite the canister such that the canister experiences a vibrational response; a receiver configured to sense the vibrational response of the canister and provide vibrational response data related to the vibrational response; and a controller operatively coupled to the driver and the receiver. The controller is configured to: control the driver to excite the canister when the canister has a known fill level; receive first vibrational response data from the receiver, the first vibrational response data corresponding to the known fill level of the canister; control the driver to excite the canister when the canister has an unknown fill level; receive second vibrational response data from the receiver, the second vibrational response data corresponding to the unknown fill level of the canister; and determine the unknown fill level using the first vibrational response data and the second vibrational response data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
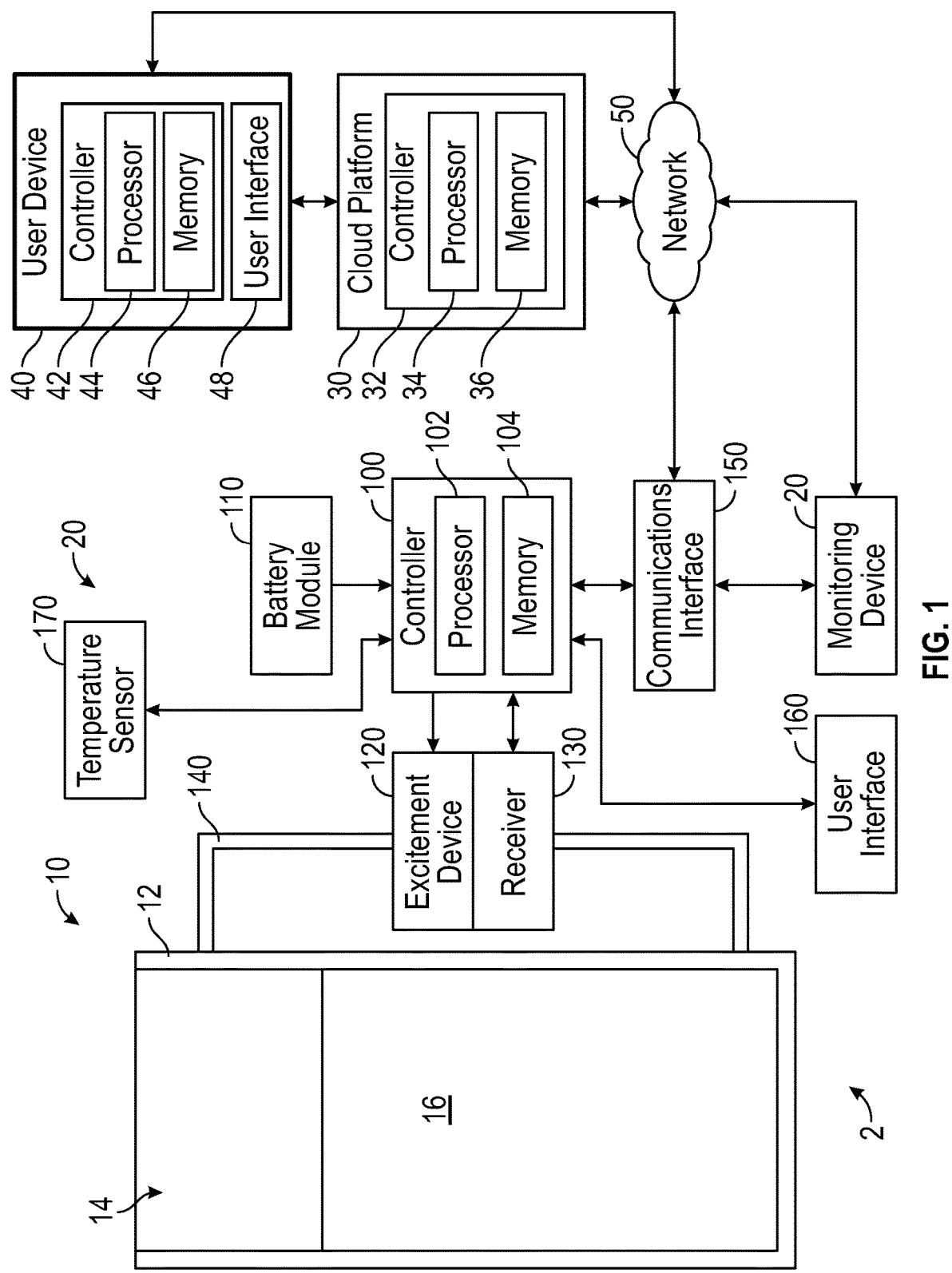
FIG. 1 is block diagram of a monitoring system for monitoring a container, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein, the term "fill level" means the amount of a material within a container. For containers that hold liquids, the fill level may correspond to the mass of the liquid, the volume of the liquid within the container, the height of the liquid within the container, or another property of the liquid. For containers that hold gasses, the fill level may correspond to the mass of the gas, the pressure of the gas at a given temperature, or another property of the gas. For containers that hold solids, the fill level may correspond to the mass of the solid or another property of the solid. The fill level may be represented as a quantity between 0%, corresponding to an empty state, and 100%, corresponding to a full state. Alternatively, the fill level may be represented as a mass, a pressure of a gas at a given temperature within a fixed volume, or otherwise represented. An empty state may indicate that no material is left within the container, or that the container is below a minimum allowable fill level (e.g., that the container should be replaced). A full state may indicate that the container is completely full (i.e., cannot contain more material), or that the container is at or above a recommended maximum fill level.

Overview

Referring generally to the Figures, a monitoring system includes a monitoring device configured to determine a condition (e.g., a fill level) of a container. The monitoring device includes an excitement device and a receiver coupled to a controller. The excitement device (e.g., a solenoid configured to strike an outside of the container, a speaker, a piezoelectric device, etc.) is configured to cause the container to vibrate. The receiver (e.g., a microphone, an accelerometer coupled to the exterior of the container, etc.) is configured to sense the resultant vibrational response (e.g., the frequency, the magnitude, etc.) of the container. A controller uses a signal from the receiver to determine a natural frequency of the container.

To determine if any material has leaked from the container or if the container is otherwise below a desired fill level, the controller commands the excitement device to excite the container when the container is in a known state where the container has known conditions (e.g., a known fill level, a known temperature of the material within the container, etc.), and the controller determines and records a first natural frequency at the known state. The controller then determines a second natural frequency of the container at a second, unknown state. The controller uses the first natural frequency to determine a relationship between the fill level of the container and the natural frequency. Using this relationship and the second natural frequency, the controller determines the fill level in the unknown condition. By comparing the fill levels in the known and unknown conditions, the controller determines how much material has leaked or otherwise escaped from the container and whether or not the container should be replaced and/or recharged.

The controller may additionally or alternatively use the sensed vibrational response to determine one or more other qualities of the container. By way of example, the controller may use the vibrational response to determine if a container is properly installed. If a container is not present in the correct position relative to the excitement device, the controller may detect an unexpected vibrational response or no response at all. By way of another example, the controller may use the vibrational response to determine what type of material is present within the container (e.g., the phase of the material, the chemical composition of the material, etc.).

Monitoring Device

Referring to FIG. 1, a monitoring system 2 for monitoring a container 10 is shown according to an exemplary embodiment. The container 10 includes one or more walls 12 that define an inner volume 14 configured to contain a volume of a material 16. The container 10 may be any type of container (e.g., a cartridge, a canister, a tank, a bucket, a box, a can, a capsule, a carton, a crate, a jar, a jug, a pot, a sack, a bag, etc.). The inner volume 14 may be sealed or in fluid communication with the surrounding atmosphere. In some embodiments, at least one of the walls 12 is hard (e.g., made from a metal, such as aluminum or steel, etc.) such that the container 10 produces an audible tone when the wall 12 is struck. The material 16 may include one or more fluid or flowable materials (e.g., a liquid, a gas, an aerosol, a series of small solid particles (e.g., sand, powder, etc.) that flow as a fluid, a Bingham plastic, etc.). The material 16 may be a homogenous or heterogenous mixture.

The monitoring system 2 includes a sensor unit, assembly, fill level monitoring device, container monitor, or container detector, shown as monitoring device 20. The monitoring device 20 is coupled to the container 10 and configured to determine information about the material 16 within the container. Specifically, the monitoring device 20 is configured to excite (e.g., vibrate) the container 10 and sense the resultant vibrational response of the container 10. Based on the vibrational response, the monitoring device 20 may be configured to determine a fill level of the container 10, the type of material 16 within the container 10, whether or not the container 10 is present or properly installed, or another condition of the container 10. The monitoring device 20 is further configured to communicate the results of the determination (e.g., the fill level, the type of material 16, an alert that the container 10 is not properly installed, etc.) to one or more external devices, shown as cloud platform 30 and user device 40. The monitoring device 20 may communicate with the cloud platform 30 and the user device 40 directly, or through a network 50.

Referring again to FIG. 1, the monitoring device 20 includes a controller, processing circuit, or microprocessor, shown as controller 100. The controller 100 is configured to communicate with and control operation of other components of the monitoring device 20. The communication may be one-way communication or two-way communication. The controller 100 includes a processor 102 and a memory device, shown as memory 104. The memory 104 may be configured to store data (e.g., vibrational response data, etc.). The memory 104 may additionally or alternatively be configured to store control logic that is executed by the processor 102 to operate the monitoring device 20.

The controller 100 is electrically coupled to a power source, shown as battery module 110. The battery module 110 is configured to provide electrical energy to power the other components of the monitoring device 20. Although FIG. 1 shows the battery module 110 as providing power to the other components through the controller 100, in other embodiments the battery module 110 powers the other components directly. In some embodiments, the battery module 110 includes one or more batteries. In other embodiments, the battery module 110 includes another type of power source. By way of example, the power source may include another type of local power storage device (e.g., capacitors, etc.). The power source may additionally or alternatively include a connection to an external power source, such as a generator, a solar panel, or a power grid.

The controller 100 is operatively coupled to a vibration actuator, driver, or exciter, shown as excitement device 120. The controller 100 may provide electrical energy and/or data (e.g., commands) to operate the excitement device 120. As shown, the excitement device 120 is separated from the container 10. In other embodiments, the excitement device 120 is directly coupled to the container 10. The excitement device 120 is configured to excite the container 10 and the material 16, causing the container 10 and the material 16 to vibrate. The excitement device 120 may include any type of actuator that is capable of causing the container 10 to vibrate. By way of example, the excitement device 120 may be or include a solenoid that is configured to strike the wall 12 of the container 10 such that the impact excites the container 10. By way of another example, the excitement device 120 may be or include a piezoelectric device configured to vibrate the wall 12. By way of another example, the excitement device 120 may be or include a speaker that produces sound waves or acoustic waves (e.g., that may be within or outside the audible range detectable by humans) that travel through the air and enter the container 10, causing the container 10 to vibrate. By way of another example, the excitement device 120 may be or include a motor coupled to an eccentric cam. The eccentric cam may strike the container 10, causing it to vibrate. Alternatively, the eccentric cam may be spun continuously by the motor such that the motor and the cam vibrate, and the motor may be coupled to the container 10 such that the vibrations are transferred to the container 10. In other embodiments, the excitement device 120 is omitted, and the container 10 is manually excited (e.g., by hitting the container 10 with a hammer, etc.).

Figure 2:
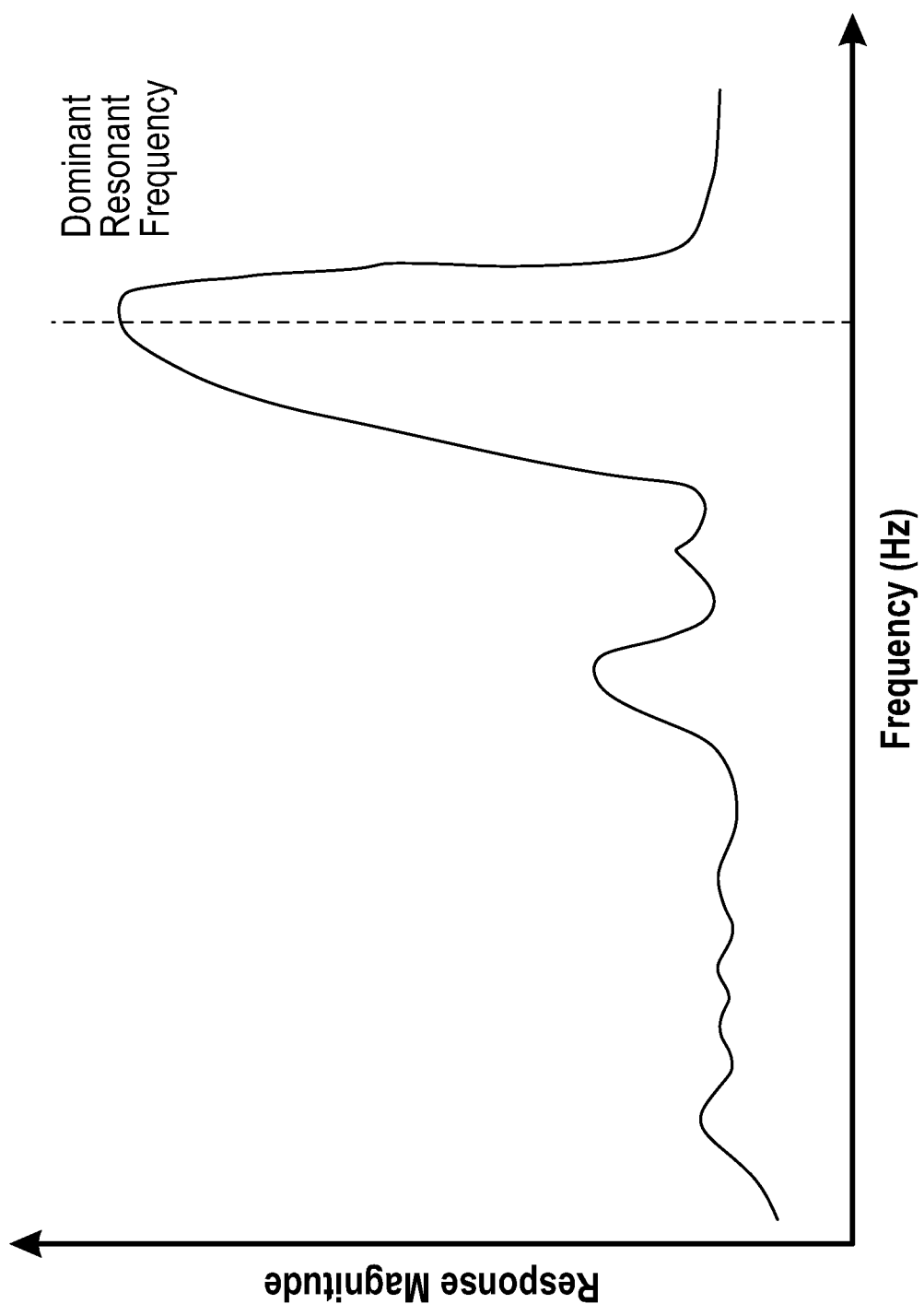
FIG. 2 is a graph of a vibrational response of the container of FIG. 1 measured by the monitoring system of FIG. 1.

The controller 100 is further operatively coupled to a sensor, shown as receiver 130. The controller 100 may provide electrical energy to and/or receive information (e.g., vibrational response data) from the receiver 130. As shown, the receiver 130 is separated from the container 10. In other embodiments, the receiver 130 is directly coupled to the container 10. The receiver 130 is configured to sense vibrations of the container 10 and provide vibrational response data corresponding to the vibration of the container 10. The vibrational response data may include the frequency of the response (i.e., frequency data) and/or the magnitude of the response (i.e., magnitude data). FIG. 2 illustrates a graph of an exemplary vibrational response of the container 10.

In some embodiments, the excitement device 120 and the receiver 130 are coupled to container 10 by a structure or chassis, shown as frame 140. The frame 140 may be directly or indirectly coupled to the container 10. The frame 140 may be fixedly coupled to the container 10 or removably coupled to the container 10. In some embodiments, the frame 140 is configured to hold the excitement device 120 and/or the receiver 130 at a predetermined distance and orientation from the wall 12 of the container 10 (e.g., against the wall 12, separated from the wall 12, etc.). By holding the excitement device 120 and the receiver 130 in a predetermined location relative to the container 10, the frame 140 may ensure that the monitoring device 20 experiences a consistent response for a given container state (e.g., a given fill level of the container 10 with a given type of material 16 at a given temperature, etc.).

The controller 100 is operatively coupled to an information transfer device, shown as communications interface 150. The communications interface 150 is configured to transfer data between the controller 100 and the cloud platform 30, the user device 40, and/or the network 50. The communications interface 150 may facilitate one-way communication or two-way communication. The communications interface 150 may facilitate wired communication or wireless communication. The communications interface 150 may include antennas, cables, ports, or other devices that facilitate the transfer of information.

In some embodiments, the controller 100 is operatively coupled to a user interface 160 configured to provide information to a user and/or to receive information (e.g., commands) from a user. The user interface 160 may include an output device configured to provide information to a user, such as a display, lights (e.g., LED's), speakers, or haptic feedback devices. The user interface 160 may additionally or alternatively include one or more input devices. A user may use the input devices to provide commands, navigate through menus, input data, or otherwise provide information to the controller 100. The user interface 160 may include any type of input device that can receive information from a user, such as buttons, knobs, switches, levers, joysticks, touchscreens, or microphones. In other embodiments, the user interface 160 is omitted.

In some embodiments, the controller 100 is operatively coupled to a sensor, shown as temperature sensor 170. The temperature sensor 170 may be directly coupled to the container 10 such that the temperature sensor 170 directly senses a temperature of the material 16. The temperature sensor 170 is configured to provide temperature data related to (e.g., containing) the sensed temperature. By way of example, the temperature sensor 170 may include a thermistor, a resistance temperature detector, a thermocouple, a semiconductor, or another type of temperature sensor. In other embodiments, the temperature sensor 170 is configured to sense a temperature of an object or fluid that is in thermal communication with the material 16 (e.g., the ambient temperature of the air surrounding the container 10, the temperature of a wall 12, a temperature of a component coupled to the container 10, etc.). Such temperatures may be related to (e.g., approximately equal to) the temperature of the material 16 (e.g., in situations where the ambient temperature changes slowly), and thus may be used to determine the temperature of the material 16. In other embodiments, the temperature sensor 170 is omitted.

Network, Cloud Platform, and User Devices

Referring again to FIG. 1, the monitoring system 2 includes the network 50. The network 50 is configured to transfer data (e.g., vibrational response data, etc.) between the monitoring device 20, the cloud platform 30, and/or the user device 40. In some embodiments, the network 50 is at least one of and/or a combination of a Wi-Fi network, a wired Ethernet network, a ZigBee network, a Bluetooth network, a cellular network, and/or any other wireless network. The network 50 may include a local area network or a wide area network (e.g., the Internet, a building WAN, etc.) and may use a variety of communications protocols (e.g., BACnet, IP, LON, etc.). The network 50 may include routers, modems, gateways, switches, servers, cell towers, satellites, and/or network switches. The network 50 may include wired and/or wireless networks. In other embodiments, the network 50 is omitted.

In some arrangements, multiple monitoring devices 20 are utilized to monitor multiple containers 10. In some such embodiments, the monitoring devices 20 are configured to communicate directly with one another. By way of example, one of the monitoring devices 20 may pass communications from another monitoring device 20 to the network 50 (i.e., the monitoring devices 20 may communicate through one another). In this arrangement, one of the monitoring devices 20 may be configured to communicate directly with the network 50 (e.g., using an Ethernet connection), and the rest of the monitoring devices 20 can communicate with the network 50 without having to be directly connected to the network 50.

Referring again to FIG. 1, the monitoring system 2 includes the cloud platform 30. The cloud platform 30 may be a data storage and processing system configured to store and process data (e.g., the vibrational response data, etc.). The cloud platform 30 may include one or more cloud devices (e.g., servers, etc.). Each cloud device may include a cloud controller (e.g., a processing circuit, a microprocessor, a controller, etc.), shown as controller 32. The controller 32 may be a hardware-defined controller or a software-defined controller. The controller 32 may include a processor 34 and a memory device, shown as memory 36. The monitoring devices 20 may communicate with the cloud platform 30 directly or through the network 50 (e.g., over the Internet, etc.). In other embodiments, the cloud platform 30 is omitted.

In some embodiments, the cloud platform 30 is configured to receive data from and/or control components of other systems. By way of example, the cloud platform 30 may control one or more systems of a building containing the monitoring device 20 (e.g., as a building management system). The cloud platform 30 may communicate with one or more Internet of Things (IoT) devices. It should be noted that the components of the cloud platform 30 can be integrated within a single device (e.g., a supervisory controller, an IoT device controller, etc.) or distributed across multiple separate systems or devices. In other embodiments, some or all of the components of the cloud platform 30 can be implemented as part of a cloud-based computing system configured to receive and process data from one or more systems, devices, and/or components. In other embodiments, some or all of the components of the cloud platform 30 can be components of a subsystem level controller, a subplant controller, a device controller, a field controller, a computer workstation, a client device, or any other system or device that receives and processes data from IoT devices.

Referring again to FIG. 1, the monitoring system 2 includes one or more user devices 40 (e.g., smartphones, tablets, laptop computers, desktop computers, servers, etc.). Each user device 40 may include a controller (e.g., a processing circuit, a microprocessor, etc.), shown as controller 42. The controller 42 may include a processor 44 and a memory device, shown as memory 46. The controller 42 of the user device 40 may be configured to store and/or process data. The user devices 40 may further include a user interface device or user interface 48. The user interface 48 may include any type of device used to provide or receive information (e.g., keyboards, mice, touchscreens, displays, microphones, speakers, lights, etc.). The user interface 48 may be configured to receive information (e.g., commands) from a user and/or provide information (e.g., as a notification, as part of a graphical user interface (GUI), etc.) to a user. The user devices 40 may be configured to communicate with the monitoring devices 20 and/or the cloud platform 30 directly and/or through the network 50.

Operation of the Monitoring System

The monitoring system 2 is configured to monitor one or more conditions of the container 10 and provide corresponding information to one or more users. Any processing of data described herein may be performed by the any of the devices described herein (e.g., the controller 100, the controller 32, the controller 42, etc.). Accordingly, data (e.g., vibrational response data) may be transferred between the different devices (e.g., over the network 50) to facilitate processing by other devices. Any user input may be provided through the user interface 160 or the user interface 48. Any information described as being provided to the user may be provided through the user interface 160 or the user interface 48.

The monitoring system 2 is generally configured to excite the container 10 with the excitement device 120, causing the container 10 to vibrate. The receiver 130 senses the vibrational response and produces vibrational response data. A controller (e.g., the controller 100) analyzes the vibrational response data to identify the dominant resonant frequency or natural frequency of the vibrational response. Based on the natural frequency, the controller determines one or more conditions of the container 10 (e.g., a fill level, the type of material 16 within the container 10, etc.). The controller 100 may additionally or alternatively determine if the container 10 is full and/or properly installed based on the natural frequency.

Figure 3:
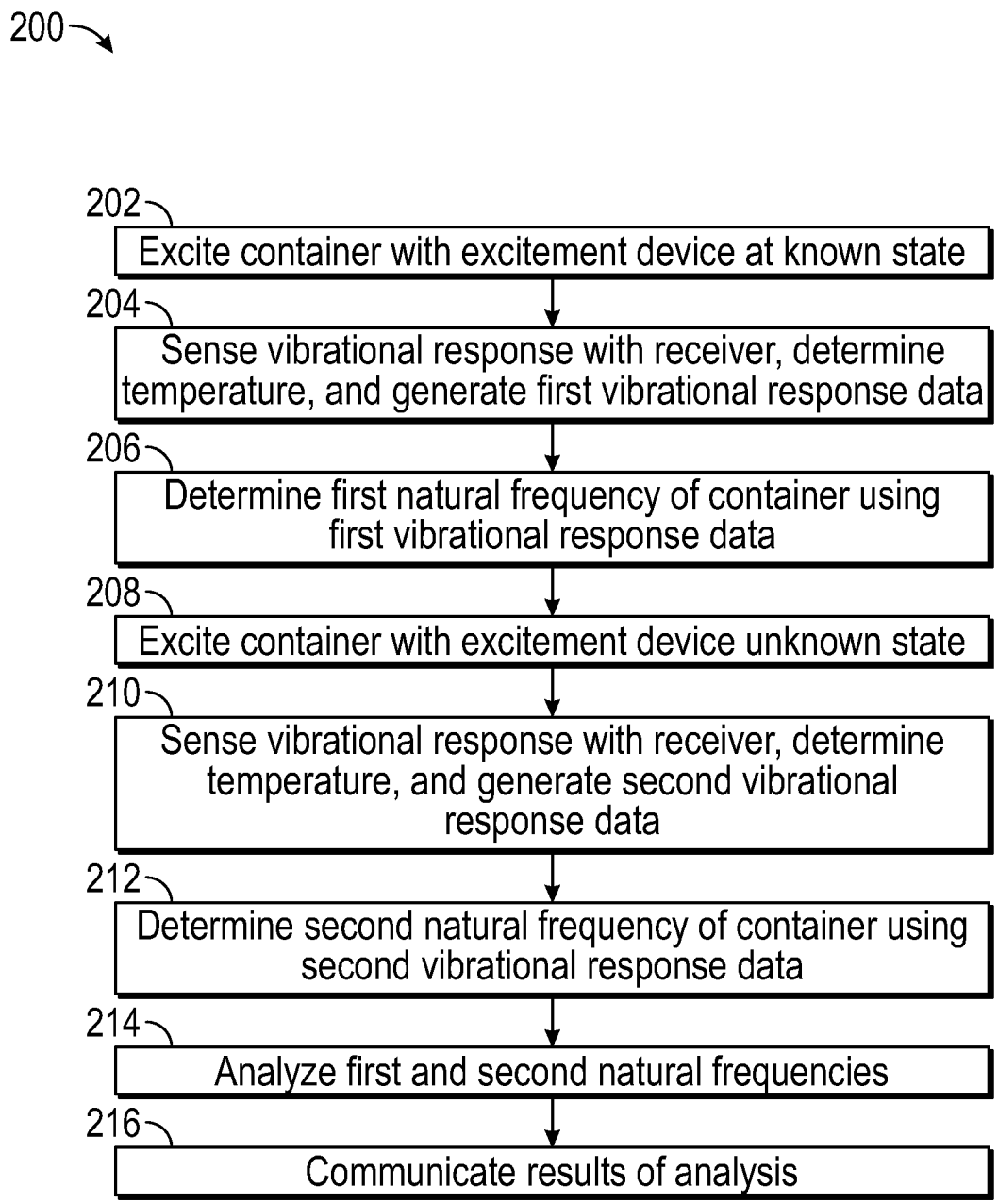
FIG. 3 is a block diagram of a method of monitoring a condition of a container, according to an exemplary embodiment.

Referring to FIG. 3, the monitoring system 2 may be configured to perform a method of monitoring a condition (e.g., fill level) of the container 10, shown as method 200. In step 202, the container 10 is excited by the excitement device 120 at a known state. Specifically, the controller 100 is configured to activate the excitement device 120 to cause the container 10 to vibrate. In some embodiments, when activated, the excitement device 120 excites the container 10 by striking a wall 12 of the container 10 (e.g., with a solenoid). In other embodiments, when activated, the excitement device 120 excites the container 10 by projecting sound waves through the air toward the container 10. In other embodiments, the excitement device 120 otherwise excites the container 10.

Step 202 may be performed when the container 10 has a known state where one or more conditions related to the container 10 are known. Because the state of the container 10 is known, the vibrational response of the container 10 in the known state may be used to generate a fingerprint or signature of the container 10. The fingerprint of the container 10 may subsequently be used to determine how the vibrational response of the container 10 corresponds to a condition of the container.

The vibrational response of the container 10 may depend upon the fill level of the container 10. As such, the known state may specify a fill level of the container 10. The fill level of the container 10 may be assumed, measured, or provided by a user (e.g., through the user interface 160). By way of example, the known state may specify that the container 10 is full (e.g., at 100% fill level). The fill level may be assumed to be at full when the monitoring device 20 is first coupled to the container 10 (e.g., indicating that the container 10 has just been replaced). A user may specify (e.g., by typing in a fill level) or confirm (e.g., by confirming that the container 10 has just been replaced) the fill level (e.g., through the user interface 160).

The vibrational response of the container 10 may depend upon the temperature of the material 16. As such, the known state may specify the temperature of the material 16. This may be provided directly by a user (e.g., through the user interface 160). Additionally or alternatively, the temperature of the material 16 may be measured by the temperature sensor 170.

The vibrational response of the container 10 may depend upon the type of material 16 in the container 10. As such, the known state may specify the type of material 16 within the container 10. The type of material may include a phase of the material (e.g., solid, liquid, gas, etc.). The type of material may include the chemical composition of the material (e.g., the material 16 is nitrogen, the material 16 is carbon dioxide, the material 16 is water, etc.). The type of material may be specified by a user (e.g., through the user interface 160), measured, or assumed.

In step 204, the receiver 130 senses the vibrational response of the container 10 and generates first vibrational response data, and the temperature is determined. Specifically, the receiver 130 may receive the vibrational response of the container 10 to the excitement of step 202 and generate vibrational response data corresponding to the known state. As shown in FIG. 2, the vibrational response data may include magnitude data related to the magnitude or amplitude of the vibrational response and/or frequency data relating to the frequency of the vibrational response. In embodiments where the receiver 130 includes an accelerometer coupled to the container 10, the magnitude data may relate to the acceleration of the wall 12 of the container 10. In embodiments where the receiver 130 includes a microphone, the magnitude data may relate to the sound pressure of the sound produced by the container 10. In other embodiments, the receiver 130 generates data that otherwise quantifies the vibrational response of the container 10.

In some embodiments, the temperature of the material 16 is determined when the vibrational response of the container 10 is sensed. In some embodiments, a user provides the temperature of the material 16 directly. By way of example, a user may determine the temperature manually (e.g., using a manual temperature sensor), and provide the temperature through a user interface (e.g., the user interface 160). Additionally or alternatively, the temperature of the material 16 may be measured by the temperature sensor 170.

In step 206, the first vibrational response data of the container 10 are analyzed. Specifically, the first vibrational response data are analyzed (e.g., by the controller 100) to determine a first natural frequency of the container 10 (e.g., using fast Fourier transformations). By way of example, the controller 100 may compare the magnitude data and the frequency data to determine which frequency had the greatest response magnitude, and select that frequency as the first natural frequency. The first natural frequency of the known container 10 may correspond to the known state of the container 10. As such, the first natural frequency may act as the fingerprint of the container 10. The first natural frequency may be stored for later use (e.g., in the memory 104) and/or the first natural frequency may be transferred to another device (e.g., the cloud platform 30).

Step 208, step 210, and step 212 may be substantially similar to step 202, step 204, and step 206, respectively, except the container 10 is excited at an unknown state. In the unknown state, one or more conditions of the container 10 are unknown. In some embodiments, the temperature of the material 16 and the type of the material 16 may be known. By way of example, the temperature of the material 16 may be assumed to be the same as when the fingerprint was generated, or the temperature may be measured by the temperature sensor 170. The type of material 16 may be assumed to be the same as when the fingerprint of the container 10 was generated. However, the fill level of the container 10 may be unknown (e.g., it may be unknown if material 16 has leaked from the container 10).

In step 208, the excitement device 120 excites the container 10 in the unknown state. In step 210, the receiver 130 senses the vibrational response of the container 10 and generates second vibrational response data. In step 212, the second vibrational response data are analyzed (e.g., by the controller 100) to determine a second natural frequency of the container 10 in the unknown state.

In step 214, the first and second natural frequencies are analyzed. Specifically, the first and second natural frequencies are analyzed (e.g., by the controller 100) to determine one or more unknown conditions of the container 10. By way of example, a mathematical relationship (e.g., a function) relating various conditions of the container 10 may be predetermined and stored (e.g., in the memory 104). This relationship may define how one or more conditions of the container 10 vary based on the natural frequency of the container 10. By way of example, for a given type of material 16, a function may relate the natural frequency of the container 10 and the temperature of the material 16 to the fill level of the container 10. The relationships between the various conditions and the natural frequency of the container 10 may be determined experimentally and stored (e.g., in a lookup table) in a memory (e.g., the memory 104).

In step 214, the first natural frequency and the conditions of the container 10 in the known state may be used (e.g., by the controller 100) to determine the relationship between the natural frequency of the container 10 and one or more conditions of the container 10. By way of example, the controller 100 may use the first natural frequency and the conditions of the container 10 in the known state to select (e.g., interpolate from a lookup table of experimental data, etc.) a function that relates the natural frequency to one or more conditions of the container 10. By way of example, the function may accept the natural frequency and the temperature as inputs and provide the fill level as an output. By way of another example, the function may accept the natural frequency and the fill level as inputs and provide the temperature of the material 16 in the container 10 as an output. By way of another example, the function may accept the natural frequency, the fill level, and the temperature of the material 16 and output the type of material 16 or a quantity that may be used to determine the type of material 16 (e.g., a variable that has numerical values corresponding to different materials).

In step 214, the second natural frequency and/or one or more conditions of the container 10 in the unknown state are used with the determined function to determine one or more other conditions of the container 10. By way of example, the controller 100 may use the determined function, the second natural frequency, and the temperature of the material 16 in the unknown state to determine the fill level of the container 10 in the unknown state.

Because the first natural frequency is used to calibrate the function, the function generated by the controller 100 may account for variations between different containers 10. By way of example, the size, shape, thickness, density, or other characteristics of the walls 12 of the container 10 may vary (e.g., due to manufacturing tolerances). Accordingly, the natural frequency for a given fill level, temperature, and type of material 16 may vary between different containers 10. This ensures that the determined condition is not subject to inaccuracies due to variations between the walls 12 of different containers 10.

In step 214, the determined condition(s) may be compared to one or more thresholds. By way of example, the fill level in the unknown state may be compared to a minimum fill level and/or a maximum fill level greater than the minimum fill level. If the fill level is below the minimum fill level, then the container 10 may be determined to be leaking. If the fill level is above the maximum fill level, then the container 10 may be determined to be overflowing or near overflowing. By way of another example, the temperature of the material 16 may be compared to an allowable temperature range to determine if the temperature is too high or too low.

In other embodiments, the monitoring system 2 is configured to analyze the first natural frequency and the second natural frequency using a different methodology. In some embodiments, the monitoring system 2 is configured to use solely the first and second natural frequencies to determine one or more conditions of the container 10. By way of example, the controller 100 may be configured to determine if greater than a threshold change in natural frequency has occurred from the first natural frequency to the second natural frequency (e.g., more than a 15 Hz increase in frequency, more than a 20% decrease in frequency, etc.). The controller 100 may determine that one or more events have occurred (e.g., the container 10 has leaked, etc.) in response to the change in natural frequency exceeding the threshold change.

In step 216, the results of the analysis are communicated. Specifically, the results of the analysis may be communicated to another of the monitoring devices 20, to the cloud platform 30, to a user device 40, and/or to a user. To communicate information to a user, one or more of the user interfaces (e.g., the user interface 48) may provide a graphical user interface (GUI), a sound, an illuminated light, an email, a text message, a notification within an application, or some other type of communication. The communication may present data to a user (e.g., "the container is 90% full")

and/or provide an alert, notification, or instruction to a user (e.g., "the container is leaking," "please replace the container," "the container is about to overflow," etc.). By way of example, the condition(s) determined in step 214 may be provided to a user directly. By way of another example, the result of the comparison of a condition with a threshold may be provided to a user (e.g., "the container is leaking," "the temperature is within the normal range," etc.). By way of another example, the based on the result of the comparison of a condition with a threshold, the monitoring system 2 may provide an instruction to a user (e.g., "20 grams of material have leaked from the container, please replace the container", etc.).

In some embodiments, the monitoring system 2 is configured to determine whether or not the container 10 is installed properly relative to the monitoring device 20. This may be performed, for example, as part of step 206 or step 212. If the container 10 is installed properly relative to the monitoring device 20, then the vibrational response of the container 10 to excitement may fall within a certain range, regardless of the conditions of the container (e.g., the fill level, the temperature of the material 16, the type of material 16, etc.). However, if the container 10 is not installed properly relative to the monitoring device 20, then the vibrational response may vary drastically. By way of example, if the excitement device 120 is a solenoid configured to strike the wall 12 of the container 10 and the container 10 is positioned far enough away that the solenoid cannot fully strike the wall 12, then the vibrational response may change pitch, change amplitude, or not occur. Accordingly, a drastically different vibrational response may indicate that the container 10 was not properly installed, or was not installed at all.

To determine whether or not the container 10 is properly installed, a controller (e.g., the controller 100) may analyze the vibrational response of the container 10 (e.g., as sensed in step 204 or step 210). The controller may compare the vibrational response to one or more thresholds. By way of example, the controller may compare the magnitude of the vibrational response (e.g., the volume of the sound emitted by the container 10, etc.) to a threshold magnitude. The controller may determine that the container 10 is not properly installed if the magnitude of the vibrational response is below the threshold magnitude. By way of another example, the controller may compare the natural frequency of the vibrational response to an upper threshold frequency and/or a lower threshold frequency. If the natural frequency is above the upper threshold frequency or below the lower threshold frequency, the controller may determine that the container 10 is not properly installed. In response to a determination that the container 10 is not properly installed, the controller may stop the method 200 and provide an alert to the user.

Fire Suppression System

Figure 4:
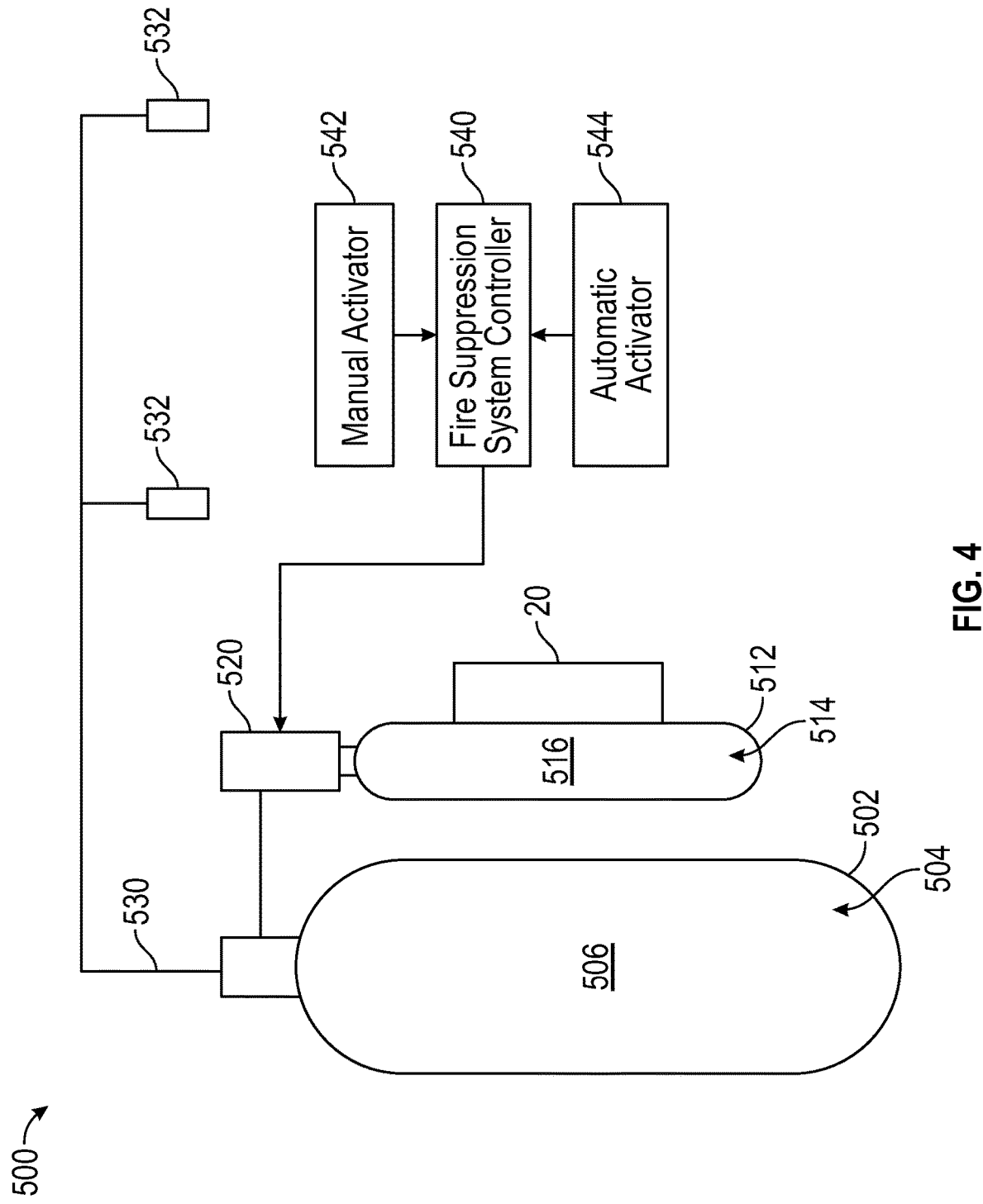
FIG. 4 is a block diagram of a fire suppression system configured to be monitored by the monitoring system of FIG. 1, according to an exemplary embodiment.

Referring to FIG. 4, a fire suppression system 500 is shown according to an exemplary embodiment. A monitoring device is used with the fire suppression system 500. Specifically, a monitoring device is used to measure the fill level of a cartridge containing pressurized expellant gas to detect when the cartridge has leaked. The fire suppression system 500 is configured to dispense or distribute a fire suppressant agent onto and/or nearby a fire, extinguishing the fire and preventing the fire from spreading.

The fire suppression system 500 can be used in a variety of different applications. Different applications can require different types of fire suppressant agent and different levels of mobility. The fire suppression system 500 is usable with a variety of different fire suppressant agents, such as powders, liquids, foams, or other fluid or flowable materials. The fire suppression system 500 can be used in a variety of stationary applications. By way of example, the fire suppression system 500 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, the fire suppression system 500 can be used in a variety of mobile applications. By way of example, the fire suppression system 500 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring again to FIG. 4, the fire suppression system 500 includes a first container or agent container, shown as fire suppressant tank 502. The fire suppressant tank 502 defines an inner volume 504 filled (e.g., partially, completely, etc.) with a material, shown as fire suppressant agent 506. In some embodiments, the fire suppressant agent is normally not pressurized (e.g., is near atmospheric pressure).

The fire suppression system 500 further includes a second container, shown as cartridge 512. The cartridge 512 defines an inner volume 514 configured to contain a volume of material, shown as pressurized expellant gas 516. The expellant gas 516 may be an inert gas. In some embodiments, the expellant gas 516 is air, carbon dioxide, or nitrogen.

The fire suppression system 500 further includes a valve, puncture device, system actuator, or activator assembly, shown as actuator 520. The actuator 520 is at least selectively coupled to the cartridge 512. Decoupling the cartridge 512 from the actuator 520 may facilitate removal and replacement of the cartridge 512 when the cartridge 512 is depleted. The actuator 520 is fluidly coupled to the fire suppressant tank 502 through a conduit or pipe.

The actuator 520 is configured to selectively fluidly couple the inner volume 514 to the inner volume 504 of the fire suppressant tank 502. In some embodiments, the actuator 520 includes one or more valves that selectively fluidly couple the inner volume 514 to the inner volume 504. In other embodiments, the cartridge 512 is sealed, and the actuator 520 includes a pin, knife, nail, or other sharp object that the actuator 520 forces into contact with the cartridge 512 to puncture the outer surface of the cartridge 512, fluidly coupling the internal volume 514 with the actuator 520. Once the actuator 520 is activated and the cartridge 512 is fluidly coupled to the fire suppressant tank 502, the expellant gas 516 from the cartridge 512 flows freely through the actuator 520 and into the fire suppressant tank 502.

The expellant gas 516 forces fire suppressant agent 506 from the fire suppressant tank 502 and into a conduit or hose, shown as pipe 530. The pipe 530 is fluidly coupled to one or more outlets or sprayers, shown as nozzles 532. The fire suppressant agent 506 flows through the pipe 530 and to the nozzles 532. The nozzles 532 each define one or more apertures, through which the fire suppressant agent 506 exits, forming a spray of fire suppressant agent 506 that covers a desired area. The sprays from the nozzles 532 then suppress or extinguish fire within that area.

The fire suppression system 500 further includes a controller, shown as fire suppression system controller 540. In response to an indication that a fire is present, the fire suppression system controller 540 is configured to activate the actuator 520 to spread the fire suppressant agent 506 and suppress the fire. The fire suppression system controller 540 is coupled to a user input device, shown as manual activator 542. The manual activator 542 is configured to receive a user input (e.g., a push of a button, a pull of a lever, etc.) when a user detects a fire. In response to receiving a user input, the manual activator 542 is configured to send an activation signal to the fire suppression system controller 540, causing the fire suppression system controller 540 to activate the actuator 520. The fire suppression system controller 540 is further coupled to a sensor, shown as automatic activator 544. The automatic activator 544 includes a sensor (e.g., an optical sensor, a temperature sensor, a smoke detector, liner detection wire, etc.) that is configured to detect the presence of a fire. In response to detecting a fire, the automatic activator 544 is configured to send an activation signal to the fire suppression system controller 540, causing the fire suppression system controller 540 to activate the actuator 520.

The fire suppression system controller 540, the manual activator 542, and the automatic activator 544 may make up a mechanical fire detection system or an electronic fire detection system. In a mechanical fire detection system, signals are transferred mechanically (e.g., through a tensile force exerted on a cable). In an electronic fire detection system, signals are transferred electronically (e.g., as electrical signals).

Figure 5:
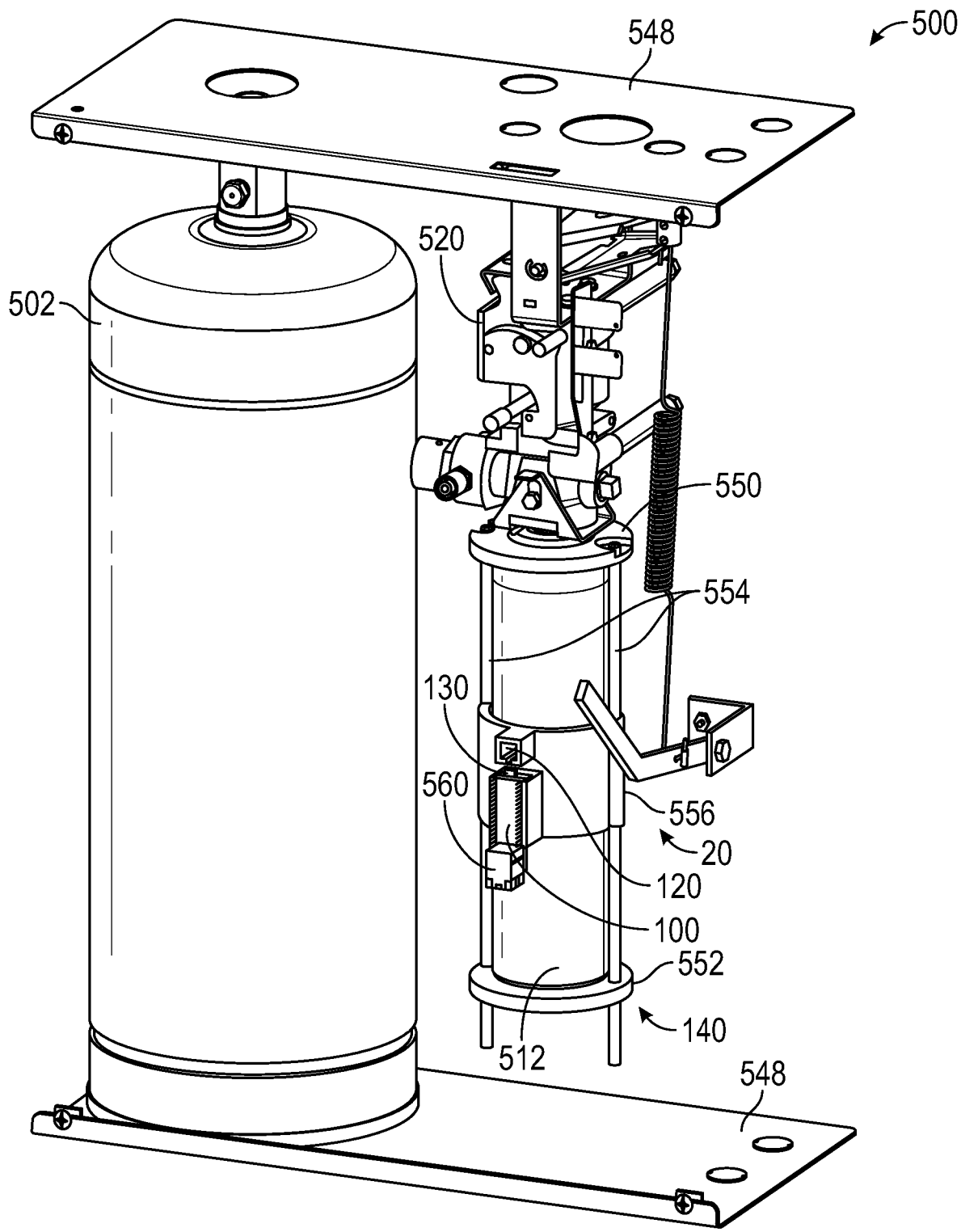
FIGS. 5-10 are various views of the fire suppression system of FIG. 4, according to an exemplary embodiment.
Figure 6:
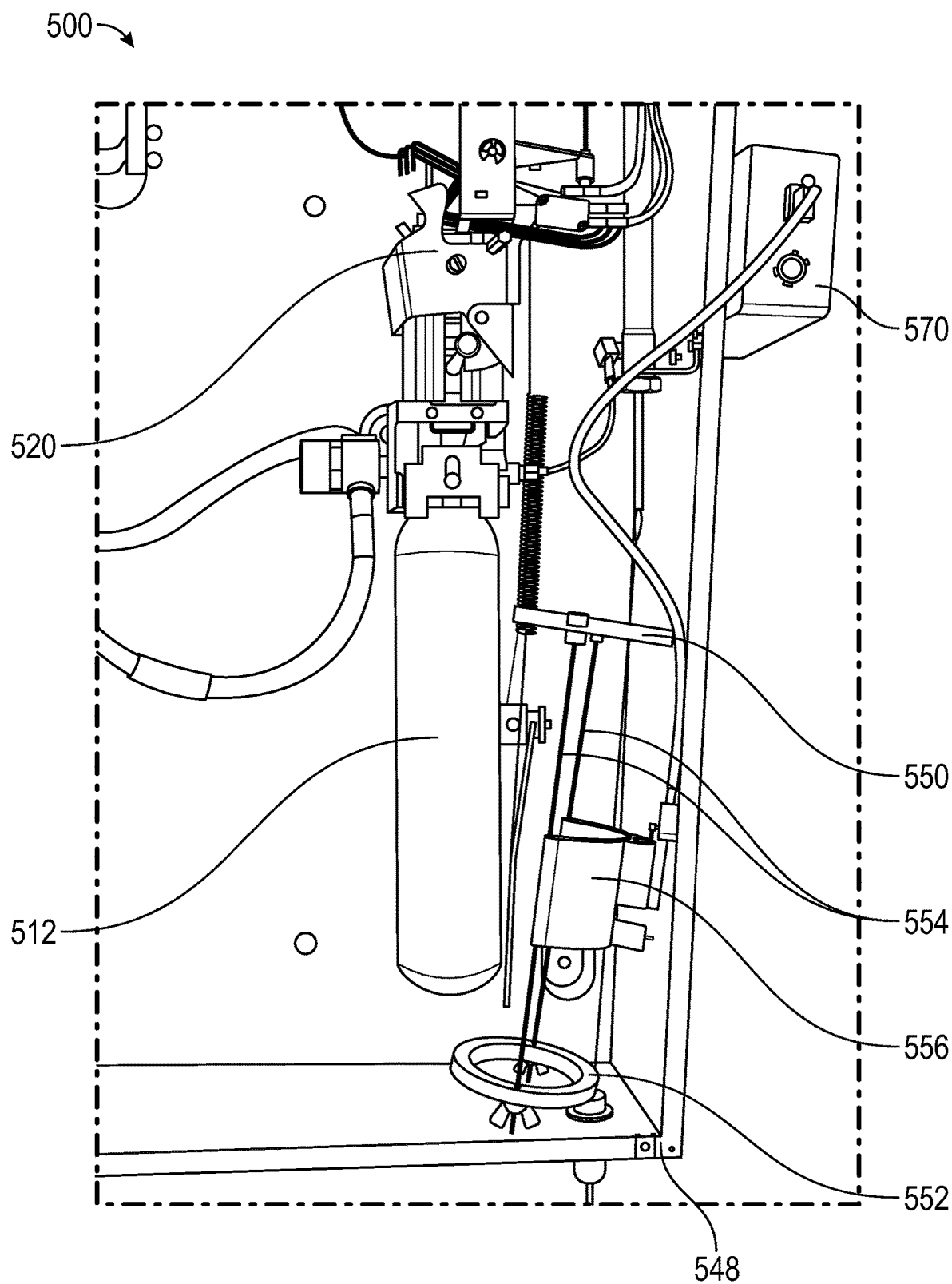
Figure 7:
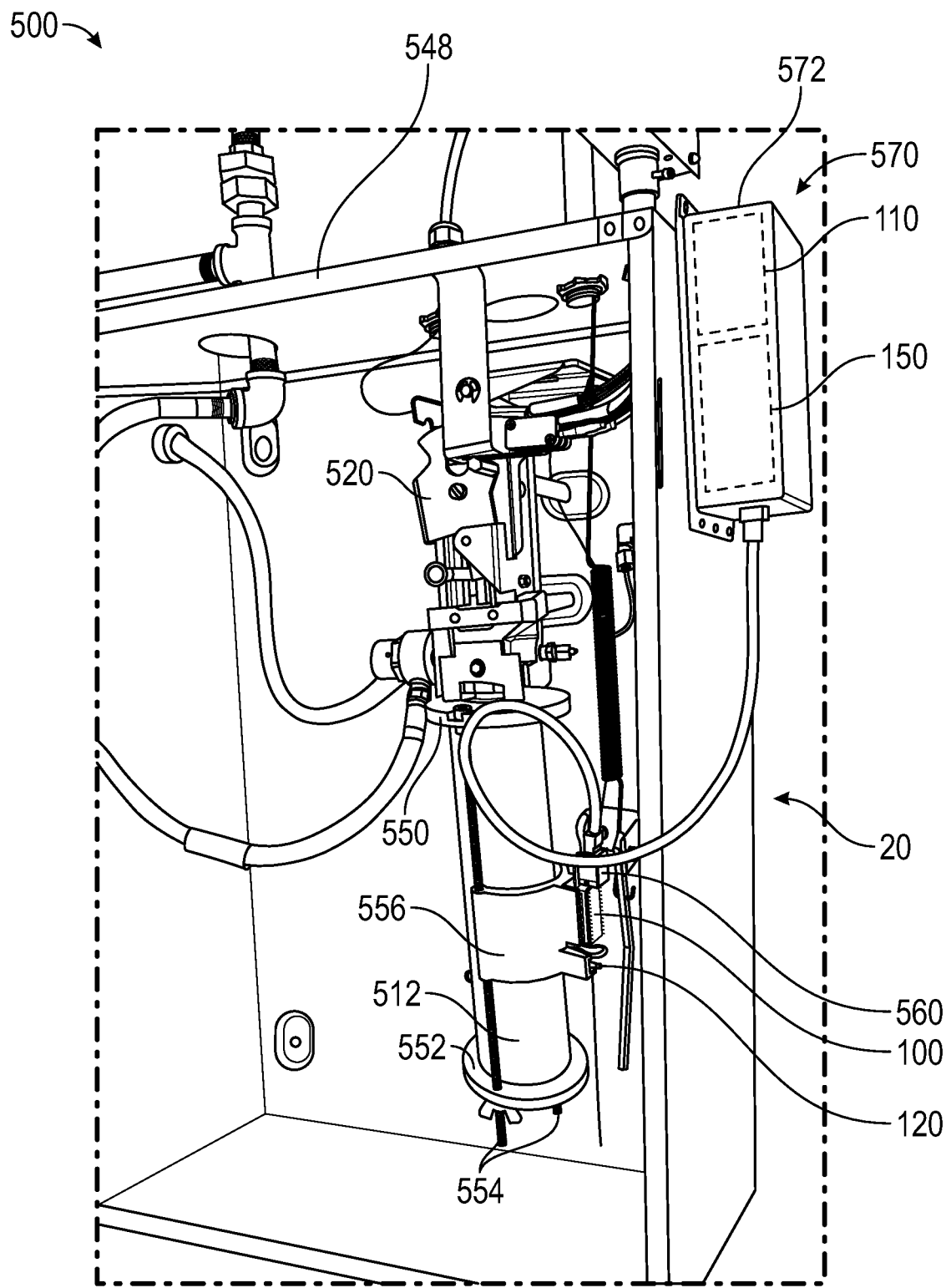

Referring to FIGS. 5-7, the fire suppressant tank 502 and the cartridge 512 are shown within a housing, shown as cabinet 548, according to one embodiment. The fire suppressant tank 502 rests upon a bottom portion (e.g., a bottom panel) of the cabinet 548. The actuator 520 is coupled to and hangs downward from a top portion (e.g., a top panel) of the cabinet 548. The cartridge 512 is coupled to and hangs downward from the actuator 520. It should be understood that mounting configurations other than those described herein may be used according to various alternative embodiments.

The frame 140 removably couples the monitoring device 20 to the cartridge 512. In this embodiment, the frame 140 includes a first support, shown as top plate 550, and a second support, shown as bottom plate 552, offset below the top plate 550. The top plate 550 forms a C-shape that is configured to receive a neck of the cartridge 512. The top plate 550 is configured to rest atop a curved outer surface of the cartridge 512. The curved shape of the curved outer surface approximately centers the top plate 550 about a central vertical axis of the cartridge 512. The bottom plate 552 defines a recess or aperture that receives a curved bottom surface of the cartridge 512, approximately centering the bottom plate 552 about the central vertical axis of the cartridge 512.

The top plate 550 and the bottom plate 552 are coupled to one another by a pair of vertical supports, shown as threaded rods 554. The threaded rods 554 extend vertically through apertures defined by the top plate 550 and the bottom plate 552 and are secured to the top plate 550 and the bottom plate 552 by fasteners. The threaded rods 554 are positioned on approximately opposite sides of the cartridge 512. A support, shown as curved support 556, is coupled to the threaded rods 554 and positioned between the top plate 550 and the bottom plate 552. The curved support 556 is curved to form a recess that receives the cartridge 512. To couple the frame 140 to the cartridge 512, the bottom curved surface of the cartridge 512 is received within the aperture of the bottom plate 552, and the frame 140 is rotated until the neck of the cartridge 512 is received by the recess of the top plate 550. The distance between the top plate 550 and the bottom plate 552 may be configured such that the top plate 550 and the bottom plate 552 press against the cartridge 512, holding the frame 140 in place.

The curved support 556 defines a series of mounting features (e.g., recesses and bosses) configured to support other components of the monitoring device 20. In this embodiment, the excitement device 120 includes a solenoid that is configured to move radially relative to the cartridge 512 to strike the cartridge 512. The excitement device 120 is coupled to the curved support 556, and the curved support 556 holds the excitement device 120 in place to facilitate a consistent striking of the cartridge 512. In this embodiment, the receiver 130 is a microphone that is configured to sense sounds produced by excitement of the cartridge 512. The receiver 130 is coupled to the curved support 556, and the curved support 556 holds the receiver 130 in place, separated from the cartridge 512, facilitating a consistent path for sound waves to travel from the cartridge 512 to the receiver 130. In this embodiment, the controller 100 is a microcontroller.

Figure 8:
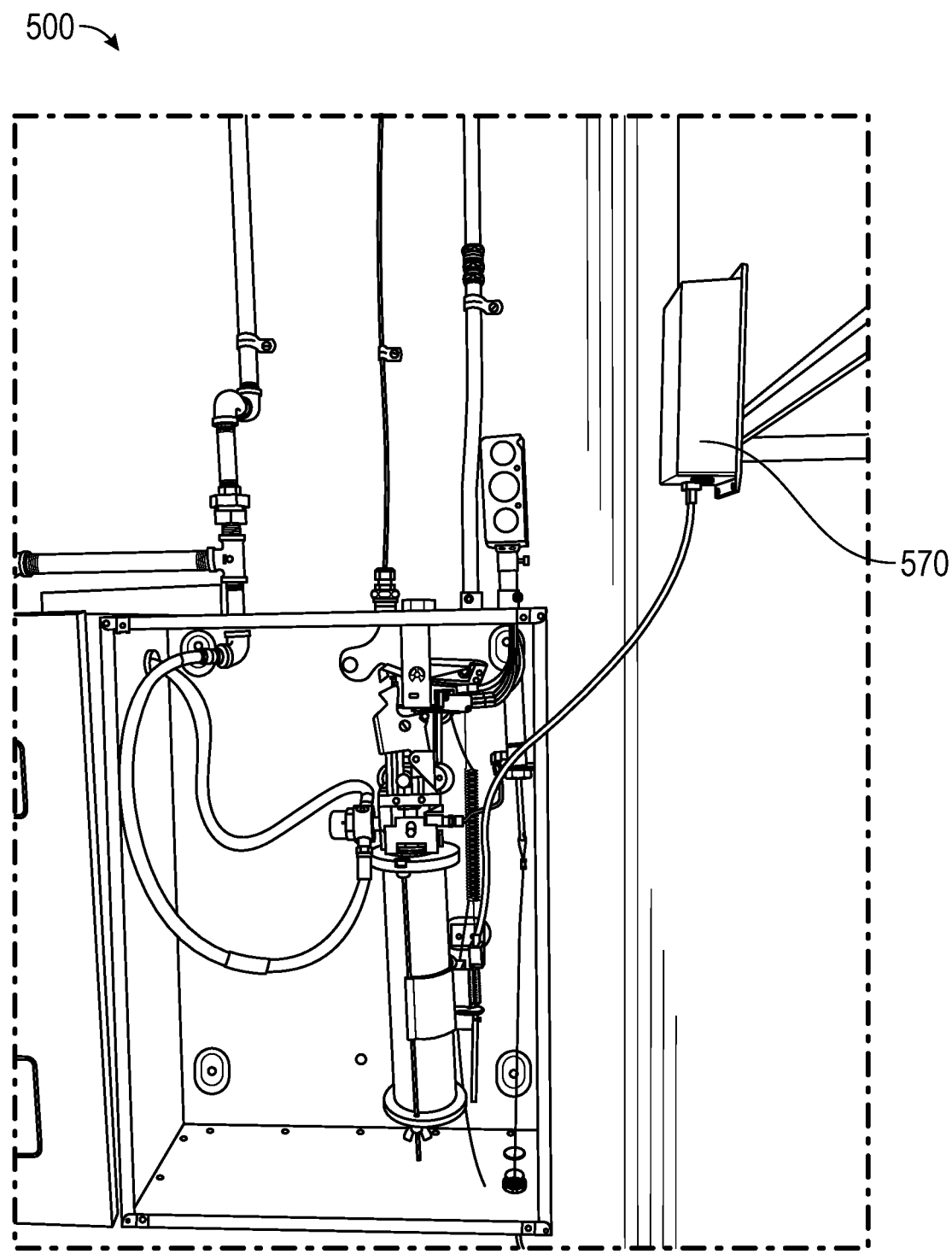
Figure 9:
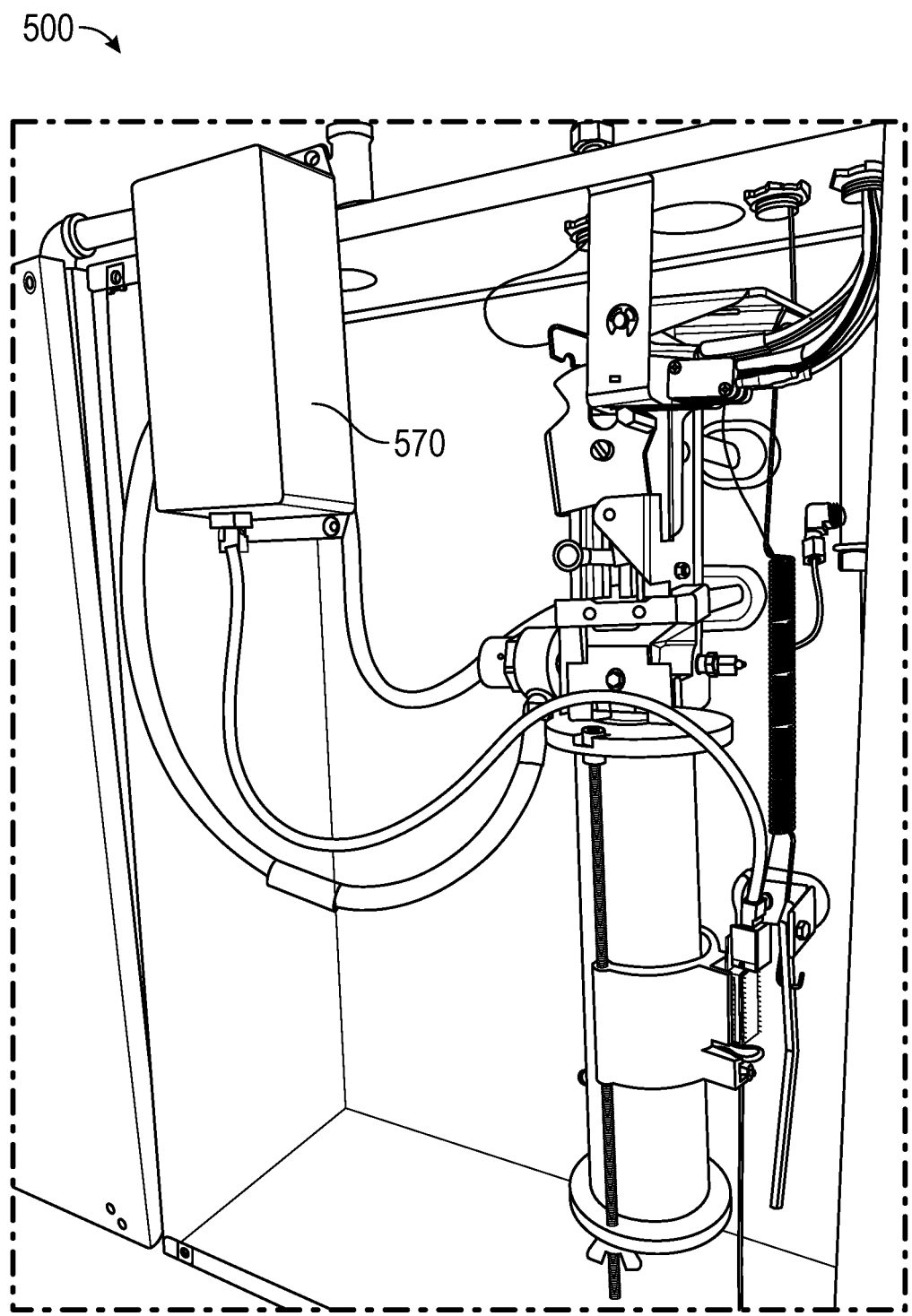
Figure 10:
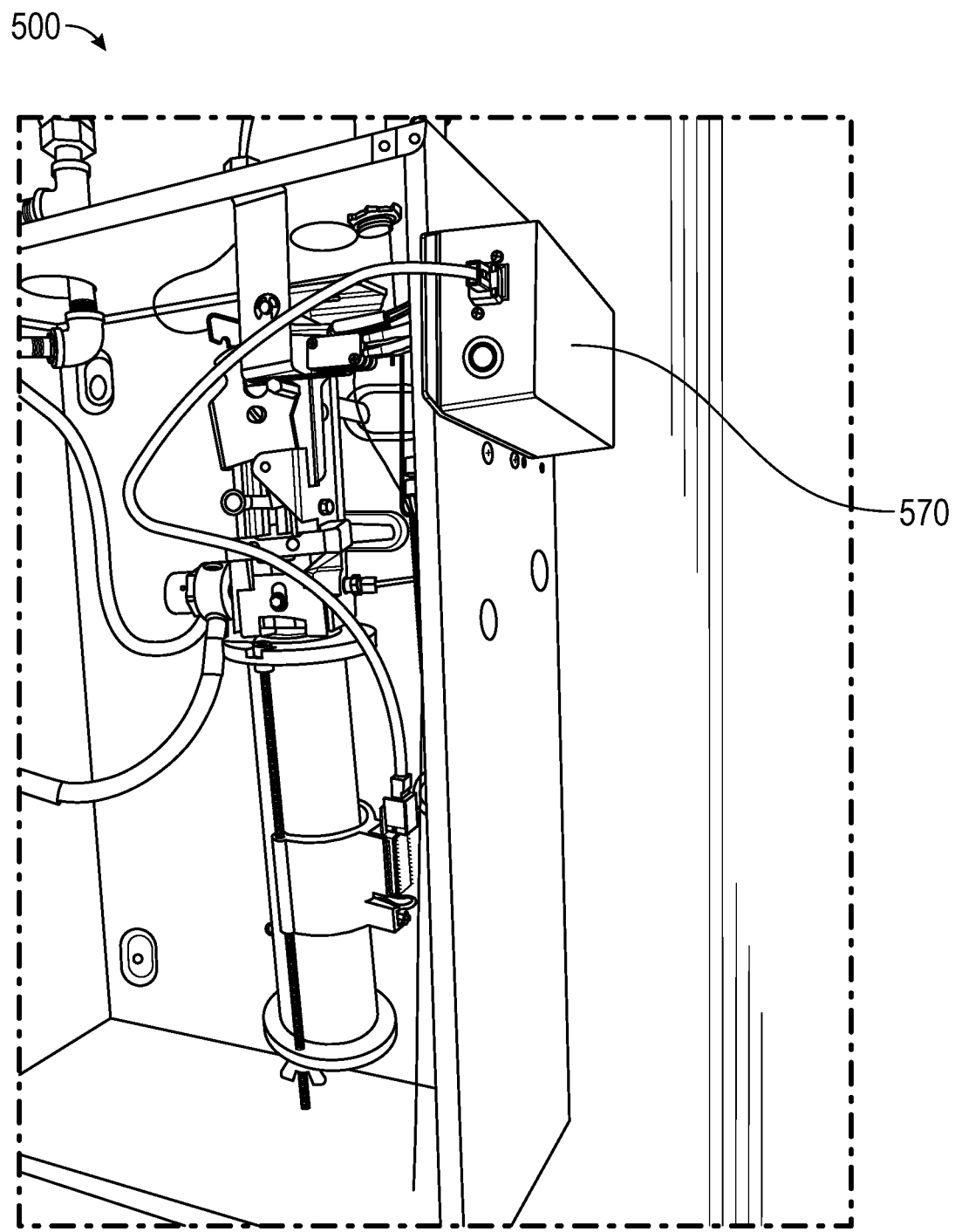

The controller 100 includes a connector, shown as Ethernet port 560. A cable, shown as Ethernet cable 562, engages the Ethernet port 560 and operatively couples the controller 100 to a separate module, shown as communications module 570. The communications module 570 includes a housing 572 that contains the battery module 110 and the communications interface 150. In this embodiment, the communications interface 150 includes a radio and/or antenna for wireless communication (e.g., with the network 50). Referring to FIGS. 8-10, the flexible nature of the Ethernet cable 562 permits movement of the communications module 570 relative to the frame 140. This facilitates placing the communications module 570 in a variety of different positions to optimize the strength of the wireless connection between the communications interface 150 and another device.

According to an exemplary embodiment, in operation, the monitoring system 2 is configured to monitor a fill level of the cartridge 512. The fire suppression system 500 often sits inactive for extended periods of time. Accordingly, if the cartridge 512 experiences even a small leak, the cartridge 512 may leak enough expellant gas 516 over time to render the fire suppression system 500 unusable or ineffective. Conventionally, to monitor the fill level of a canister for leakage, a user would have to manually disconnect the canister from the actuator and weigh the canister, determining based on the change in the mass of the canister how much the canister has leaked. The monitoring system 2 is configured to monitor the fill level electronically and automatically, reducing labor expenses and increasing the frequency with which the fill level may be monitored. Additionally, because the monitoring system 2 monitors the fill level externally, the monitoring system 2 does not introduce a potential leak into the fire suppression system 500 (e.g., which could otherwise be introduced by measuring the pressure of the expellant gas 516 directly with a pressure sensor).

The monitoring system 2 may utilize the method 200 to monitor the fill level of the cartridge 512. In step 202, the controller 100 commands the excitement device 120 to strike the cartridge 512, causing the cartridge 512 to vibrate and produce sound waves. In step 204, the receiver 130 senses the produced sound waves and generates first vibrational response data based on the sound waves. Steps 202 and 204 are performed in a known state of the cartridge 512. Step 202 may be performed immediately after the cartridge 512 is installed, such that the cartridge 512 is known or assumed to be full (e.g., having a 100% fill level). The type of expellant gas 516 (e.g., nitrogen, carbon dioxide, etc.) within the cartridge 512 may be known by the user (e.g., as marked on the exterior of the cartridge 512), and the user may provide this information to the controller 100 (e.g., through the user interface 48 of the user device 40). The temperature of the expellant gas 516 may be determined in step 204 (e.g., measured by a user and provided to the controller 100 through a user interface, measured by the temperature sensor 170, etc.). In step 206, the controller 100 determines the first natural frequency or fingerprint of the cartridge 512 based on the first vibrational response data.

Subsequently, the processes of step 202, step 204, and step 206 are repeated for an unknown state of the cartridge 512. This unknown state may correspond to a time after the cartridge 512 has been installed where it is otherwise unclear if the cartridge 512 has leaked. Specifically, the fill level is unknown in this state and should be determined. In step 208, the controller 100 commands the excitement device 120 to strike the cartridge 512, causing the cartridge to vibrate and produce sound waves. In step 210, the receiver 130 senses the produced sound waves, generates second vibrational response data based on the sound waves, and determines the temperature of the expellant gas 516. In this unknown state, the type of expellant gas 516 may be assumed to not have changed. In this unknown state, the temperature of the expellant gas 516 may be provided by a user and/or measured by the temperature sensor 170. In step 212, the controller 100 determines the second natural frequency of the cartridge 512 in the unknown state based on the second vibrational response data.

In step 214, the controller 100 analyzes the first and second natural frequencies to determine the fill level of the cartridge 512. The controller 100 may utilize (a) the first natural frequency and (b) the temperature of the expellant gas 516, the type of expellant gas 516, and the fill level in the known state to determine a function that relates the temperature of the expellant gas 516 and the natural frequency of the cartridge 512 to the fill level of the cartridge 512. The controller 100 may determine the function using predetermined experimental data stored in the memory 104. The controller 100 may utilize (a) the determined function, (b) the second natural frequency, and (c) the temperature of the expellant gas 516 and the unknown state to determine the fill level of the cartridge 512 in the unknown state. The fill level may be expressed as a percentage (e.g., 70% full, etc.), a pressure of the expellant gas 516 at a given temperature, a mass of the expellant gas 516, or otherwise expressed.

In some embodiments, the controller 100 compares the determined fill level to a threshold fill level. If the fill level in the current unknown state is greater than the threshold fill level, then the cartridge 512 has not leaked or has leaked an acceptable amount of expellant gas 516. If the fill level is less than the threshold fill level, then the cartridge 512 has leaked an unacceptable amount of expellant gas 516 and should be replaced or refilled. The threshold fill level may be predetermined, selected by a user, and/or based upon the first natural frequency of the container 10.

In other embodiments, the controller 100 is configured to analyze the first natural frequency and the second natural frequency using a different methodology. In some embodiments, the controller 100 is configured to use solely the first and second natural frequencies to determine one or more conditions of the container 10 (e.g., without monitoring the temperature of the expellant gas 516). By way of example, the controller 100 may be configured to determine if greater than a threshold change in natural frequency has occurred from the first natural frequency to the second natural frequency (e.g., more than a 15 Hz increase in frequency, more than a 20% decrease in frequency, etc.). The conroller 100 may determine that the cartridge 512 has leaked when the change in natural frequency is greater than the threshold change.

In step 216, the monitoring system 2 communicates the results of the analysis. In some embodiments, the monitoring system 2 communicates to a user (e.g., through a GUI provided by one of the user interfaces) the change in fill level from the known state (i.e., where the cartridge 512 was full) to the current unknown state. Additionally or alternatively, the monitoring system 2 communicates to a user whether or not the change in fill level indicates that the cartridge 512 should be replaced or refilled. By way of example, the change in fill level may indicate that the cartridge should be replaced or refilled when the change in fill level falls outside of a predetermined range (e.g., an acceptable range, a threshold range, etc.). By way of example, the monitoring system 2 may provide a GUI that indicates how much mass of expellant gas 516 has been lost and whether or not the cartridge 512 should be replaced. By way of another example, the monitoring system 2 may provide a notification (e.g., an email, a text message, a notification in an application, an alarm, etc.) to a user (e.g., through the user interface 48) in response to a determination that the cartridge 512 should be replaced or refilled. The monitoring system 2 may not provide the notification in response to a determination that the cartridge 512 is full.

Steps 208-216 may automatically be repeated periodically to continue monitoring the fill level of the cartridge 512. This facilitates identifying leaks in the cartridge 512 that begin later in the life of the fire suppression system 500. Because this process is completed automatically, the fill level of the cartridge 512 may continue to be monitored without requiring a user to interact with the fire suppression system 500. The monitoring device 20 consumes electrical energy each time a measurement of the fill level is completed. As such, the period between measurements may be selected to balance measurement frequency with power consumption. In some embodiments, the period between measurements may be specified by a user.

In some embodiments, the monitoring system 2 includes multiple monitoring devices 20, each configured to monitor a different cartridge 512 or other container. In some such embodiments, the monitoring system 2 may provide a single GUI that permits viewing the results of the monitoring of all of the cartridges 512 simultaneously. In some embodiments, the monitoring system 2 provides a notification when the fill level of one of the cartridges 512 is unacceptable. The notification may include information that identifies the non-compliant cartridge 512 (e.g., an identification number of the cartridge 512, a location of the cartridge 512, etc.).

In some embodiments, the monitoring system 2 is configured to determine whether or not the cartridge 512 is installed properly relative to the monitoring device 20. This may be performed, for example, as part of step 206 or step 212. To determine whether or not the container 10 is properly installed, the controller 100 may analyze the vibrational response of the container 10 (e.g., as sensed in step 204 or step 210). The controller 100 may compare the vibrational response to one or more thresholds. By way of example, the controller 100 may compare the volume of the sound emitted by the container 10 to a threshold volume. The controller may determine that the container 10 is not properly installed if the volume of emitted sound is below the threshold volume. By way of another example, the controller 100 may compare the natural frequency of the vibrational response to an upper threshold frequency and a lower threshold frequency. If the natural frequency is above the upper threshold frequency or below the lower threshold frequency, the controller 100 may determine that the container 10 is not properly installed. In response to a determination that the container 10 is not properly installed, the controller may stop the method 200 and provide an alert to the user.

Figure 11:
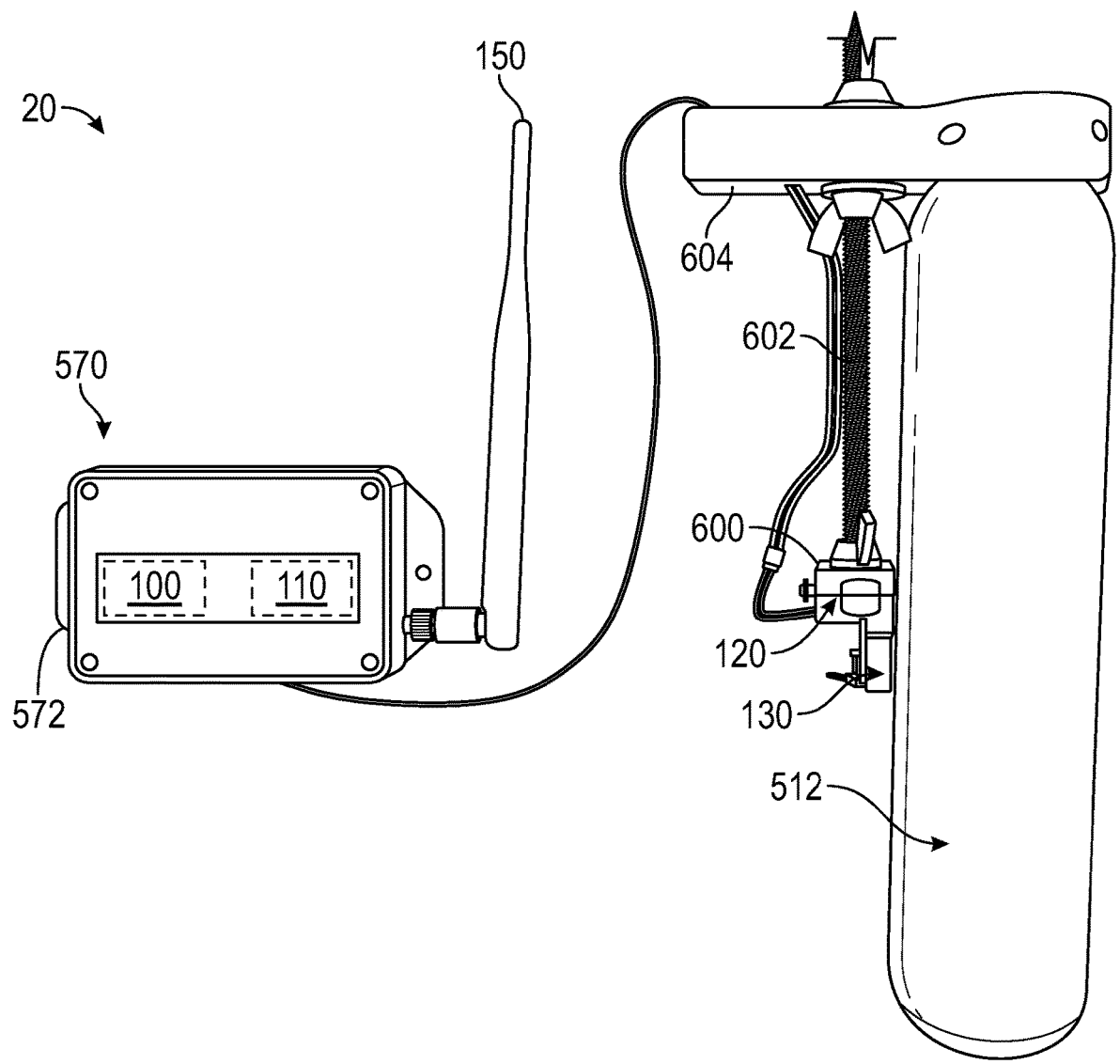
FIG. 11 is a front view of a monitoring system, according to another exemplary embodiment.

FIG. 11 illustrates an alternative arrangement of the monitoring device 20. In this embodiment, the controller 100 is incorporated into the communications module 570. The excitement device 120 (shown as a solenoid) and the receiver 130 (shown as a microphone) are coupled to a first support 600. A vertical member, shown as threaded rod 602, couples the first support 600 to a second support 604. The second support is coupled (e.g., clamped to) a neck of the cartridge 512. Together, the first support 600, the threaded rod 602, and the second support 604 act as a frame that couples the excitement device 120 and the receiver 130 to the cartridge 512.

It should be understood that, while various embodiments disclosed herein relate to monitoring a fill level of the cartridge 512, the teaching herein may be applicable to a wide variety of containers, and all such applications are to be understood to be within the scope of the present disclosure.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Additionally, any element disclosed in one embodiment may be incorporated or utilized with any other embodiment disclosed herein.

What is claimed is:

1. A system, comprising:
a controller for monitoring a fill level of a container;
an actuator operatively coupled to the controller and configured to excite the container; and
a receiver operatively coupled to the controller and configured to sense a vibration of the container,
wherein the controller is configured to:
receive first vibrational response data relating to a vibrational response of the container in a first state;
receive second vibrational response data relating to a vibrational response of the container in a second state;
use the first vibrational response data and the second vibrational response data to identify a change in fill level of the container between the first state and the second state;
control the actuator to attempt to excite the container in a third state;
receive third vibrational response data from the receiver in the third state; and
provide a notification to a user in response to a determination that the container is not properly installed based on the third vibrational response data.

2. The system of claim 1, wherein the notification is a first notification, and wherein the controller further configured to provide a notification to the user in response to a determination that the fill level of the container in the second state is below a predetermined threshold fill level.

3. The system of claim 1, wherein the first state is a known state in which the fill level of the container is known, and wherein the second state is an unknown state in which the fill level of the container is unknown.

4. The system of claim 1, wherein the receiver is configured to sense the vibrational response of the container in the second state and provide the second vibrational response data to the controller.

5. The system of claim 4, wherein the receiver includes an accelerometer coupled to the container and configured to sense the vibrational response of the container in the second state.

6. The system of claim 4, wherein the receiver includes a microphone configured to sense acoustic waves produced by the container in the second state.

7. The system of claim 1, wherein the controller is configured to control the actuator to cause the vibrational response of the container in the second state.

8. The system of claim 7, wherein the actuator is positioned to contact the container while the actuator excites the container.

9. The system of claim 7, wherein the actuator includes a speaker.

10. The system of claim 1, further comprising a frame selectively coupled to the container, coupled to the receiver and the actuator, and configured to limit movement of the receiver and the actuator relative to the container.

11. The system of claim 1, wherein the controller is configured to:
receive temperature data relating to a temperature of a material within the container; and
use the first vibrational response data, the second vibrational response data, and the temperature data to identify the change in fill level of the container between the first state and the second state.

12. The system of claim 11, further comprising a temperature sensor operatively coupled to the controller and positioned to provide the temperature data, wherein the temperature data includes:
first temperature data relating to relating to a temperature of the material within the container in the first state; and
second temperature data relating to a temperature of the material within the container in the second state.

13. The system of claim 1, wherein the system is a fire suppression system, wherein the container is an expellant gas container, and wherein the fire suppression system further comprises:
an agent container containing a fire suppressant agent;
a nozzle at least selectively fluidly coupled to the agent container; and
a system actuator configured to selectively fluidly couple the expellant gas container to the agent container to force the fire suppressant agent through the nozzle.

14. The system of claim 1, wherein the controller is configured to:
determine a first natural frequency of the container in the first state using the first vibrational response data;
determine a second natural frequency of the container in the second state using the second vibrational response data; and
compare the first natural frequency and the second natural frequency to identify the change in fill level of the container between the first state and the second state.

15. The system of claim 1, wherein the actuator is configured to strike an exterior surface of the container to excite the container, wherein the controller is configured to control the actuator to cause the vibrational response of the container in the second state.

16. The system of claim 1, wherein the controller is configured to:
receive temperature data relating to a temperature of a material within the container; and
use the first vibrational response data, the second vibrational response data, and the temperature data to identify the change in fill level of the container between the first state and the second state based on a predetermined relationship between the vibrational response of the container in the second state, the temperature of the material, and the fill level of the container in the second state.

* * * * *